United States Patent
Fleizach et al.

(10) Patent No.: US 10,733,708 B2
(45) Date of Patent: Aug. 4, 2020

(54) METHOD FOR ESTIMATING TURBULENCE USING TURBULENCE PARAMETER AS A FOCUS PARAMETER

(71) Applicant: The United States of America as represented by the Secretary of the Navy, San Diego, CA (US)

(72) Inventors: Gregory K. Fleizach, San Diego, CA (US); Daniel Avila, Dartmouth, MA (US); Carmen Carrano, Livermore, CA (US)

(73) Assignee: United States of America as represented by Secretary of the Navy, Washington, DC (US)

( * ) Notice: Subject to any disclaimer, the term of this patent is extended or adjusted under 35 U.S.C. 154(b) by 60 days.

(21) Appl. No.: 16/140,310

(22) Filed: Sep. 24, 2018

(65) Prior Publication Data

US 2020/0098092 A1    Mar. 26, 2020

(51) Int. Cl.
*G06T 5/00* (2006.01)

(52) U.S. Cl.
CPC .................................. *G06T 5/003* (2013.01)

(58) Field of Classification Search
CPC ....................................................... G06T 5/003
See application file for complete search history.

(56) References Cited

U.S. PATENT DOCUMENTS

| | | | |
|---|---|---|---|
| 4,688,086 A | 8/1987 | Hutchin | |
| 6,057,935 A * | 5/2000 | Freeman | ................. G06T 5/004 358/1.9 |
| 7,245,742 B2 | 7/2007 | Carrano et al. | |
| 2004/0179848 A1* | 9/2004 | Belenkii | ............... H04B 10/112 398/131 |
| 2014/0105515 A1 | 4/2014 | Zhu et al. | |
| 2014/0368715 A1 | 12/2014 | Shih et al. | |
| 2015/0156463 A1 | 6/2015 | Humphrey | |
| 2015/0293140 A1 | 10/2015 | Barille | |
| 2018/0324359 A1* | 11/2018 | Pan | ..................... H04N 5/23267 |

OTHER PUBLICATIONS

Carmen J. Carrano, Speckle Imaging over Horizontal Paths, Proceedings of SPIE, Nov. 6, 2002, pp. 109-120, vol. 4825, SPIE.
Stephen T. Kozacik et al., Comparison of Turbulence Mitigation Algorithms, Optical Engineering, Jul. 2017, pp. 071507-1 to 071507-8, vol. 56(7), SPIE.

(Continued)

*Primary Examiner* — Marcos L Torres
(74) *Attorney, Agent, or Firm* — Naval Information Warfare Center, Pacific; Kyle Eppele; Young Fei

(57) ABSTRACT

A method for mitigating turbulence in an image. A set of initial turbulence parameters is chosen. A fast de-turbulence algorithm is applied using each initial turbulence parameter to an original image, resulting in an enhanced image. The sharpness of each enhanced image is measured. The sharpness is recorded along with the corresponding initial turbulence parameter in a sharpness curve. The knee of the sharpness curve is calculated. An estimated turbulence parameter $r_0$ is determined according to the knee. A de-turbulence algorithm is applied to the original image using $r_0$.

9 Claims, 6 Drawing Sheets

(56) References Cited

OTHER PUBLICATIONS

O. Von Der Luehe, Estimating Fried's Parameter from a Time Series of an Arbitrary Resolved Object Imaged through Atmospheric Turbulence, Journal of the Optical Society of America, May 1984, pp. 510-519, vol. 1, Issue 5, OSA Publishing.

Xiang Zhu, Automatic Parameter Selection for Denoising Algorithms Using a No-Reference Measure of Image Content, IEEE Transactions on Image Processing, Dec. 2010, pp. 3116-3132, vol. 19, No. 12, IEEE.

* cited by examiner

METHOD FOR ESTIMATING TURBULENCE USING TURBULENCE PARAMETER AS A FOCUS PARAMETER

FEDERALLY SPONSORED RESEARCH AND DEVELOPMENT

The Method for Estimating Turbulence Using Turbulence Parameter as a Focus Parameter is assigned to the United States Government and is available for licensing and commercial purposes. Licensing and technical inquiries may be directed to the Office of Research and Technical Applications, Space and Naval Warfare Systems Center Pacific (Code 72120), San Diego, Calif., 92152 via telephone at (619) 553-2778 or email at ssc_pac_t2@navy.mil. Reference Navy Case 103918.

BACKGROUND OF THE INVENTION

1. Field of the Invention

The present invention generally relates to methods for image processing, and in particular to an algorithm for automatically estimating the turbulence of a scene to correct for atmospheric blurring, sensor motion, and optical aberrations.

2. Description of the Related Art

Atmospheric turbulence is caused by fluctuations in the refraction index which cause phase errors, blurring, and shifting the image. These errors occur along the optical path from the object being imaged to the imaging sensor. Accordingly, the phase errors are different at every object point. The visual effect is an overall image blur and relative image motion. Typically, these effects are the worst for long horizontal and slant paths, and the effects tend to be intensified with increases in temperature. Turbulence mitigation (also known as "de-turbulence") techniques attempt to resolve the blur and image motion caused by turbulence. Resolution improvements of up to 20× have been demonstrated with these techniques.

Many approaches exist to mitigate the turbulence in imagery, with varying effectiveness. However, all of the approaches have one disadvantage or another that make them difficult to use. For example, the bispectral speckle imaging turbulence mitigation algorithm (hereinafter "bispectrum algorithm") is very effective, but requires manual tuning of the $r_0$ Fried parameter (referred to as the "turbulence parameter"). The bispectrum algorithm is described by Carmen J. Carrano in Speckle Imaging over Horizontal Paths, Proc. SPIE 4825, Nov. 6, 2002, pp. 109-120. The turbulence estimate is then the turbulence parameter value that was manually determined to generate the best improvement in the imagery. There are other systems that attempt to measure the atmospheric turbulence automatically, but these approaches are overly complex and hard to implement practically.

Another type of turbulence mitigation system uses deformable mirrors to change the physical optics instead of operating on the recorded imagery. These systems can be effective, but they are costly, complicated, and face a problem of accurately being able to measure the turbulence parameters in order to inform the mirror adaptations. It is also possible to use stereo cameras to estimate and mitigate turbulence. The disadvantage of this approach is that it requires a hardware change for systems already in place, which may not be possible in some instances.

Still other turbulence mitigation approaches are active in nature, which means they use lasers to transmit pulses and will measure these reflections. This is contrasted with passive turbulence mitigation systems, which do not emit energy, but rather operate on the recorded imagery. Active systems have the advantage of being able to directly estimate the turbulence, but can be expensive and bulky. Additionally, there are many scenarios in which active laser emissions are unacceptable, and so a passive method would be required.

The Q-metric method for measuring image sharpness is described by Xiang Zhu in Automatic Parameter Selection for Denoising Algorithms Using a No-Reference Measure of Image Content, IEE Transactions on Image Processing, Vol. 19, No. 12, December 2010, pp. 3116-32.

SUMMARY OF THE INVENTION

The present invention is a method for mitigating turbulence in an image. A set of initial turbulence parameters is chosen. A fast de-turbulence algorithm is applied using each initial turbulence parameter to an original image, resulting in an enhanced image. The sharpness of each enhanced image is measured. The sharpness is recorded along with the corresponding initial turbulence parameter in a sharpness curve. The knee of the sharpness curve is calculated. An estimated turbulence parameter $r_0$ is determined according to the knee. A de-turbulence algorithm is applied to the original image using $r_0$.

BRIEF DESCRIPTION OF THE DRAWINGS

Throughout the several views, like elements are referenced using like elements. The elements in the figures are not drawn to scale, and some dimensions may be exaggerated for clarity.

DETAILED DESCRIPTION OF THE INVENTION

The present invention solves the problem of accurately and automatically estimating the Fried parameter $r_0$ (referred to as the "turbulence parameter"), which is a measure of the amount of turbulence present in an image or in video. If there is no additional blurring from sensor motion or optical aberrations, then the estimated $r_0$ value will be a true measure of the turbulence. Otherwise, the $r_0$ estimate will include these other effects as well. However, because a goal of the method is to enhance the image, correcting these other effects is desirable as well.

The present invention is a method to accurately and automatically estimate the turbulence in recorded imagery.

This is accomplished by treating the turbulence parameter $r_0$ as a focus adjustment. Broadly, a turbulence parameter $r_0$ is chosen, an appropriate turbulence mitigation technique is applied, and then the sharpness of the resulting enhanced image is measured. By repeating this procedure a number of times, it is possible to determine the optimal value of $r_0$ to enhance the image.

Figure 4:
FIG. 4 is an original image showing turbulence.
Figure 5:
FIG. 5 is an enhanced image after a de-turbulence algorithm has been applied.

The turbulence parameter $r_0$ is defined as the atmospheric correlation length or Fried parameter. An image with turbulence, caused by local temperature gradients along the imaging path, displays blurring with a resolution of $\lambda/r_0$, where $\lambda$ is the center wavelength of imaging. Thus, in a scenario where turbulence is present, the resolution of the image is degraded by a factor of $D/r_0$, where D is the aperture of the imaging sensor. The turbulence parameter $r_0$ (or a similar parameter) is used by turbulence mitigation algorithms to control the strength of the mitigation. The value of $r_0$ to use in the turbulence mitigation is directly proportional to the amount of turbulence along the imaging path. FIG. 4 is an unmodified, original image showing the presence of turbulence. FIG. 5 depicts the image of FIG. 4 after it has been enhanced through application of a bispectrum algorithm using 11 mm as the value of $r_0$.

Figure 1:
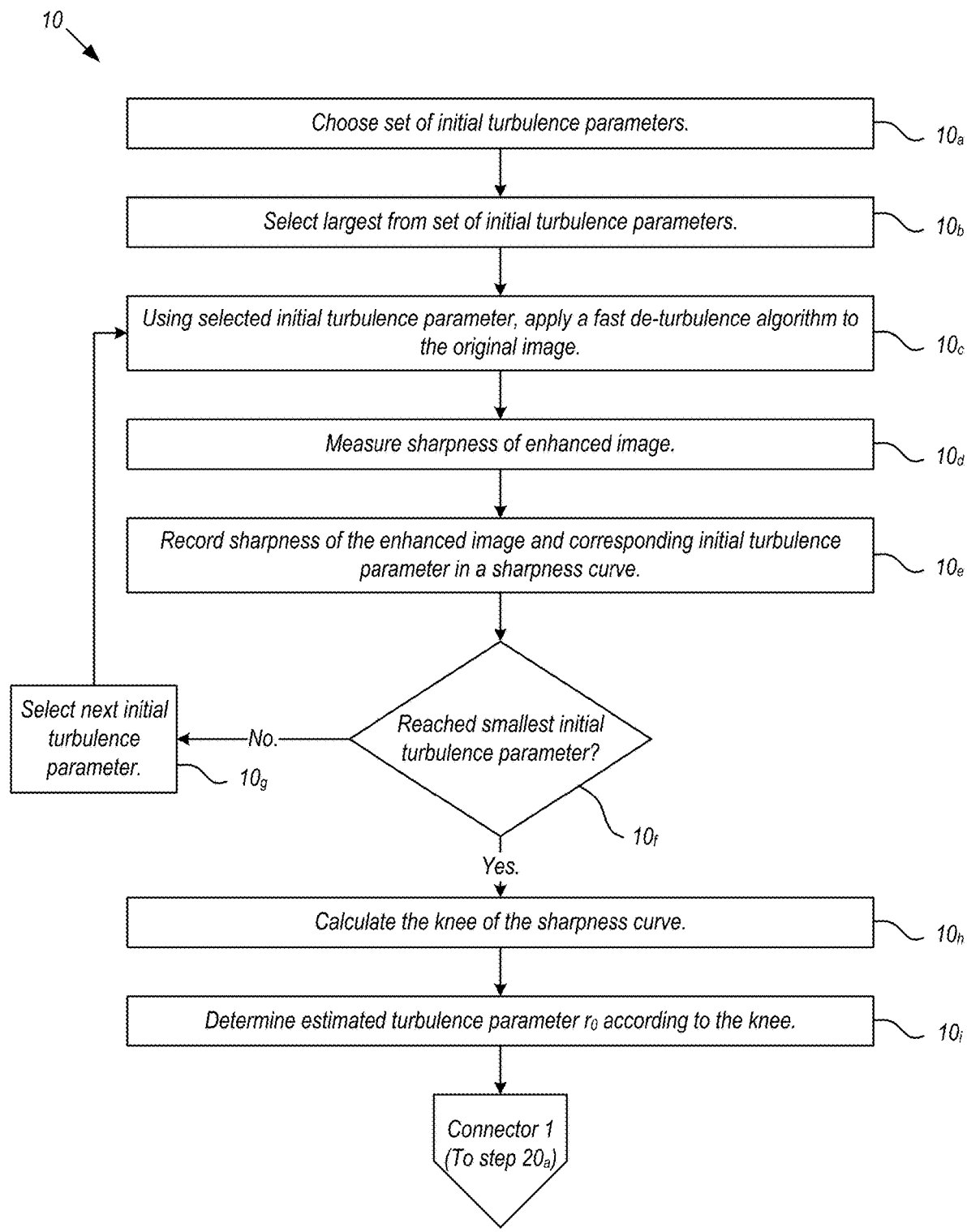
FIG. 1 is a flowchart of a method for mitigating turbulence in an image, in accordance with one embodiment of the present invention.

FIG. 1 depicts steps of a method 10 for mitigating turbulence in an image. The initial step of method 10 is to choose an initial set of initial turbulence parameters. Step $10_a$. For example, in one embodiment, the initial estimate is an $r_0$ value of 50 mm. The appropriate range of the set of initial turbulence parameters is determined as a function of sensor optics. The largest from the set of initial turbulence parameters is selected. Step $10_b$. Using the selected initial turbulence parameter, turbulence mitigation can be performed by applying a fast de-turbulence algorithm using that selected initial turbulence parameter to the original image. Step $10_c$. The turbulence mitigation algorithm can be any of a variety of algorithms where $r_0$ is involved in computing the function to compensate for atmospheric-based blurring. In this embodiment, bispectrum processing is used. Because the algorithm of step $10_c$ can vary, the present invention is compatible with existing turbulence mitigation algorithms. Next, the sharpness (or "focus") of the enhanced image can be measured. Step $10_d$. For each initial turbulence parameter value, the sharpness of the enhanced image is recorded along with the corresponding initial turbulence parameter in a sharpness curve. Step $10_e$. Next, the algorithm determines whether the initial turbulence value is the smallest values in the step. Step $10_f$. If the initial turbulence value is not the smallest value, the initial turbulence parameter is decreased to the next parameter in the set. Step $10_g$. Steps $10_c$ through $10_f$ are then repeated. If at step $10_f$ the initial turbulence value is the smallest value in the set, then the sharpness curve is complete.

Figure 3:
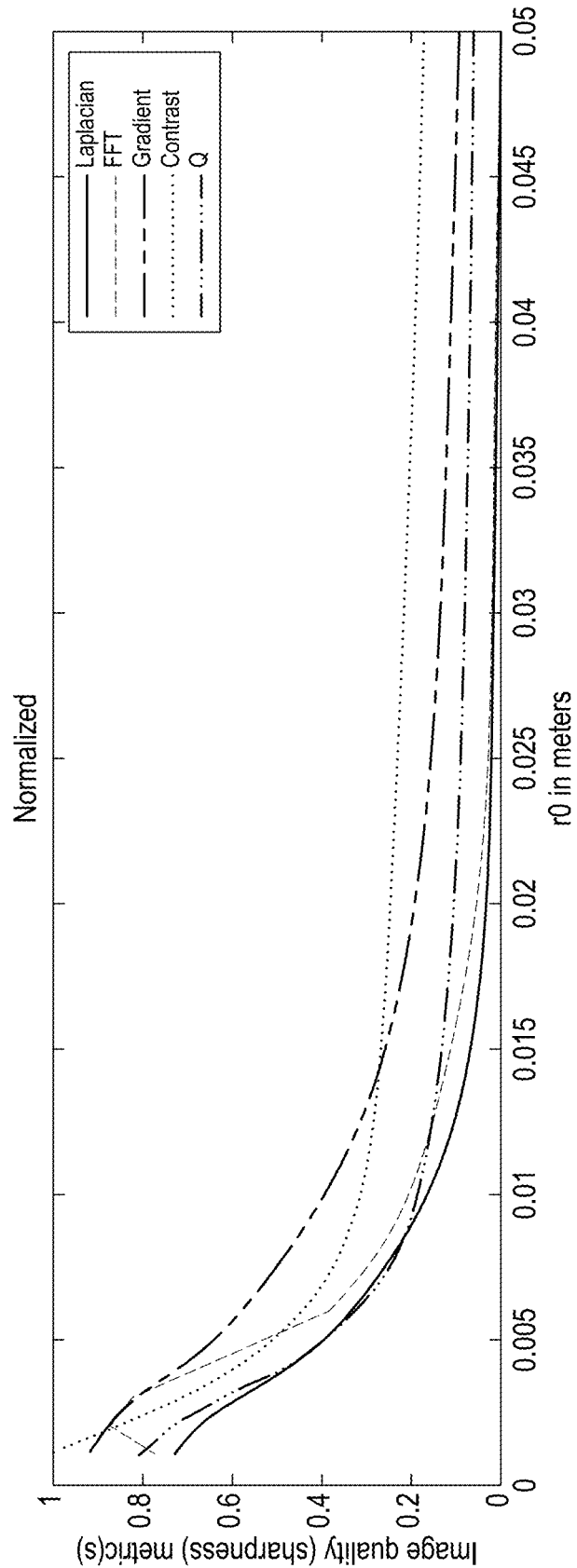
FIG. 3 is a plot of sharpness curves according to one embodiment of the present invention.

FIG. 3 depicts such sharpness curves according to several embodiments of the invention. As with the turbulence mitigation step, the sharpness can be measured in a number of different ways. FIG. 3 depicts the measured sharpness results for five different methods: the Laplacian, the fast Fourier transform, the gradient, the contrast, and the Q-metric methods. FIG. 3 shows that these five sharpness measurement methods produce comparable results. After generating a complete sharpness curve, the "knee" can be calculated according to conventional methods. Step $10_h$. The "knee" of the curve is treated as the salient point at which the image quality will no longer increase as the initial turbulence parameter is decreased. After reaching the "knee," further decreasing the initial turbulence parameter will tend to over-compensate and cause distortion. Thus, the $r_0$ value corresponding with the "knee" is determined to be the correct estimated turbulence parameter $r_0$ to be used for the de-turbulence algorithm. Step $10_i$.

Figure 6:
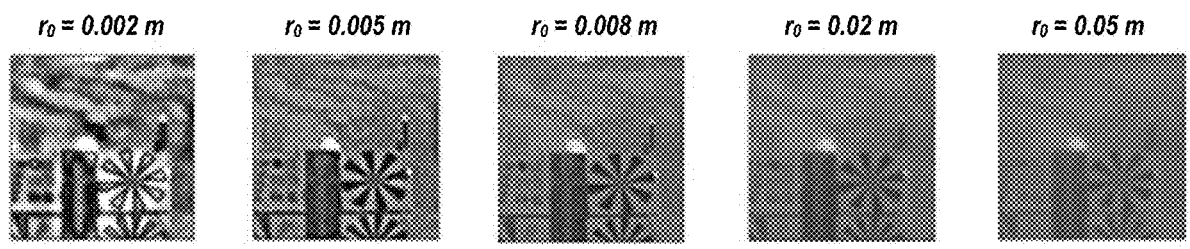
FIG. 6 depicts the effects of applying a de-turbulence algorithm using different turbulence parameters.

The five curves shown in FIG. 3 illustrate that all the sharpness measuring methods have similar behavior. The gradient method yields a slightly higher $r_0$ estimate than the other four methods. The Q-metric method provides the most pronounced "knee," but the location of the "knee" is quite close for the Q-metric method, the Laplacian, fast Fourier transform, and contrast methods. In this embodiment, the contrast method is chosen. The "knee" is easily computed for the contrast method, and appears to correspond with an $r_0$ value of 0.008 meters. Examples of a de-turbulence algorithm run with various values for $r_0$ is shown in FIG. 6. From FIG. 6, it is apparent that $r_0$ values above 0.008 meters yield a blurry image. As $r_0$ is decreased and approaches 0.008 meters, they become more clear. However, once $r_0$ is decreased below 0.008 meters, the image begins to look unnatural (at 0.005 meters), and eventually simply saturated at the top and bottom end of the intensity map (at 0.002 meters).

FIG. 6 shows that adjusting the $r_0$ parameter for the de-turbulence algorithm is akin to adjusting the focal length of a camera lens. For values of $r_0$ that are higher than the actual value, the image looks blurry. As the $r_0$ value approaches the true $r_0$ value, the imaged scene comes into focus. The difference between adjusting $r_0$ for this application and adjusting the focus for a camera lens is that as the $r_0$ value is lowered past the actual $r_0$ value, the image does not become blurry again. Instead, the image becomes too sharp, as illustrated in FIG. 6.

The contrast method used to measure the sharpness of the image at step $10_d$ is relatively simple. The contrast metric is simply computed as the standard deviation of the image divided by the mean value of the image, which can be calculated very quickly. The Q-metric method is more involved, but sometimes can produce preferable results.

By selecting a set of $r_0$ values, performing turbulence mitigation, and calculating the sharpness of the resulting image at each $r_0$ value, a curve of sharpness metrics which are a function of $r_0$ can be generated. The "knee" in this curve will provide an accurate estimate of the turbulence in the imaged scene. By tracking this value for a number of images, and performing smoothing to minimize estimation noise, an accurate $r_0$ estimate can be developed. From this time-averaged $r_0$ estimate, the turbulence in a scene can be effectively mitigated by applying a de-turbulence algorithm with the estimated $r_0$ value.

Figure 2:
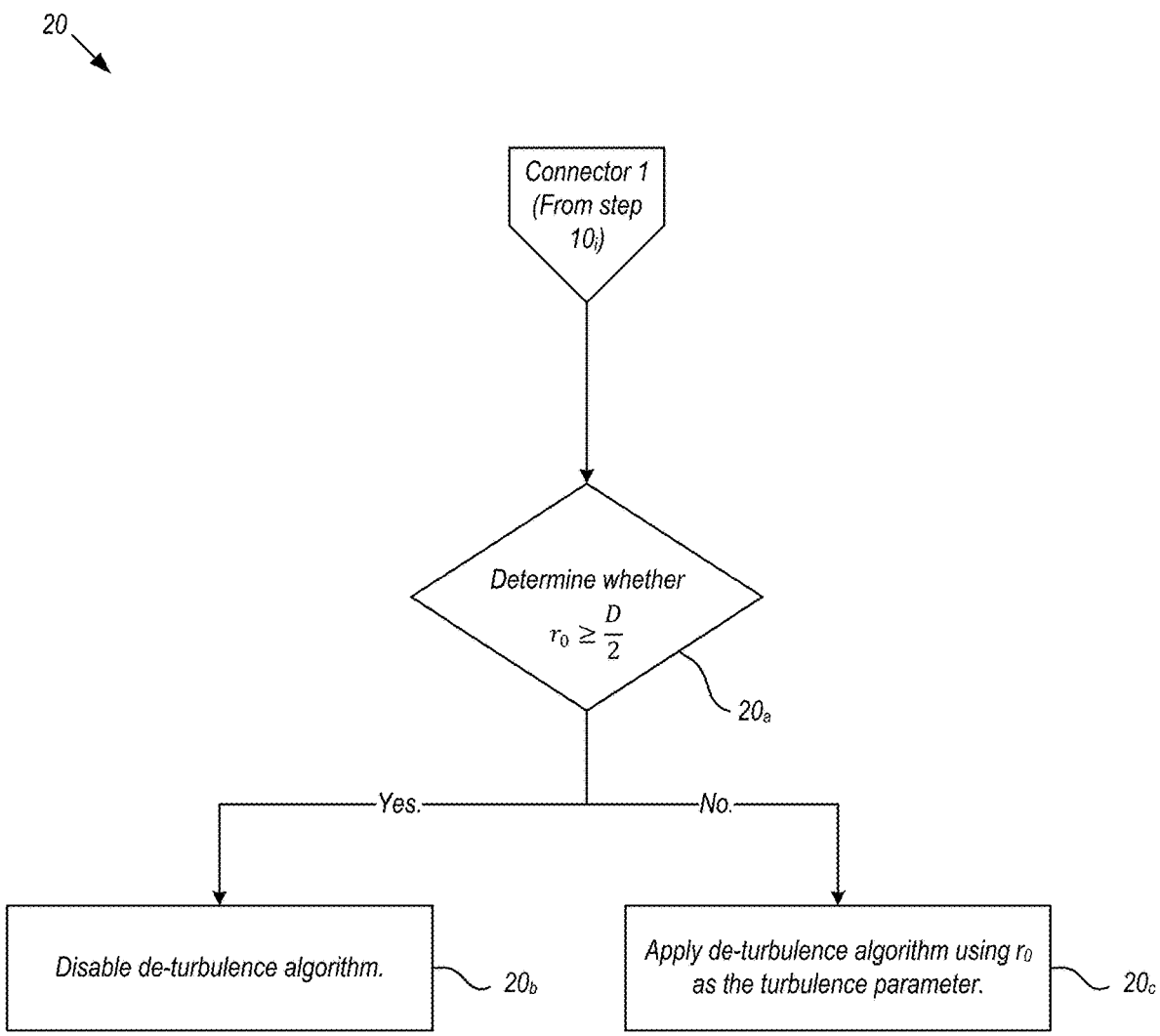
FIG. 2 is a flowchart of a method for mitigating turbulence in an image, in accordance with one embodiment of the present invention, and is a continuation of FIG. 1.

Additionally, FIG. 2 shows that the invention can be used to indicate whether turbulence exists or not. That is, it may be used to determine whether turbulence mitigation is necessary. Due to camera sampling and the diffraction limit of the telescope effects, the algorithm will not normally be set up to estimate $r_0$ values at or above half of the aperture diameter of the optical system, but a high $r_0$ value would be computed in cases where there was little or no turbulence. For example, if D is 10 centimeters and $r_0$ is computed to be in the range of 3 centimeters to 5 centimeters, then the image has captured a very low turbulence regime. If turbulence does not exist, computational resources can be saved by turning off the turbulence mitigation. Step $20_a$ of FIG. 2 is a continuation from step $10_i$ of FIG. 1. At step $20_a$, the method determines whether the condition of equation 1 is true:

$$r_0 \geq \frac{D}{2}, \quad (1)$$

wherein D is the aperture diameter of the optical system used to create the original image. If the condition of equation 1 is true, then the de-turbulence algorithm is disabled. Step $20_b$. If the condition of equation 1 is false, then the de-turbulence algorithm is applied using $r_0$ as the turbulence parameter. Step $20_c$.

An advantage of this invention is that it does not require any specialized hardware and can be used with existing sensors, as it operates on the recorded imagery directly. Another advantage is that this method is conceptually streamlined and easy to implement in software. The resultant computational cost is low, and the algorithm can be run in real-time or faster than real-time. A third advantage is that the invention is passive, and does not require any active energy-emitting components. This method can be applied to limited regions of an image to speed up the estimation, or it can be applied to a number of regions to accurately estimate turbulence in a varied scene. For example, the background of an image typically displays more turbulence than the foreground because the light from the background travels through more atmosphere to reach the camera. Therefore, instead of generating a single turbulence estimate for the whole image, the turbulence can be estimated on different tiles, and the tiles of the background will have a lower $r_0$ estimate than those in the foreground. In this way, the present invention can be used to implement a locally-adaptive turbulence mitigation scheme. This invention can also be applied after imagery has been recorded, an improvement over the requirement of a deformable mirror system that the turbulence correction must occur concurrently with the image being recorded. Similarly, reflection data from active systems must be available in order for turbulence estimation to be performed using those systems. The present invention requires only the recorded imagery itself.

The invention does not necessarily need to be used to estimate atmospheric turbulence. It can also be used to estimate the correction parameters for blurring from certain static or time-varying optical aberrations. The algorithm used to calculate the sharpness of the turbulence-mitigated result can be any of a variety of algorithms. Different algorithms may work best for different scenarios.

The algorithm used to perform turbulence mitigation does not need to be the bispectrum algorithm. For example, a simplified version of the bispectrum algorithm called speckle-lite, that only performs the speckle magnitude deconvolution one frame at a time, may be preferred since it is easier to calculate and sufficient to estimate $r_0$ with this method. Additionally, a completely different turbulence mitigation algorithm can be used as well.

The $r_0$ values to search can be chosen in a non-uniform and/or adaptive manner in order to speed up the search for the "knee" in the curve. The $r_0$ estimation can be computed every frame, over a number of frames and averaged, or intermittently, depending on the situation. It is possible to let a user initiate the $r_0$ estimate using a "focus" button or by selecting an object in the image. Alternatively, the $r_0$ estimation can be run on a schedule. The averaging can be implemented with simply a flat low-pass filter, or more complicated methods, and the number of frames to average over may be tailored according to application.

Identifying the location of the "knee" in the curve may be performed according to conventional techniques.

This invention may be used for turbulence detection in addition to or instead of turbulence estimation. That is, it can also be used to indicate whether a scene is turbulent in the first place, which may be independent of the turbulent estimation portion.

From the above description of the present invention, it is manifest that various techniques may be used for implementing its concepts without departing from the scope of the claims. The described embodiments are to be considered in all respects as illustrative and not restrictive. The method disclosed herein may be practiced in the absence of any element that is not specifically claimed and/or disclosed herein. It should also be understood that the present invention is not limited to the particular embodiments described herein, but is capable of being practiced in many embodiments without departure from the scope of the claims.

What is claimed is:

1. A method for mitigating turbulence in an image, comprising:
choosing a set of initial turbulence parameters;
applying a fast de-turbulence algorithm using each initial turbulence parameter to an original image, resulting in an enhanced image;
measuring a sharpness of the enhanced image;
recording the sharpness and the corresponding initial turbulence parameter in a sharpness curve;
calculating a knee of the sharpness curve;
determining an estimated turbulence parameter $r_0$ according to the knee;
determining whether $$r_0 \geq \frac{D}{2},$$

wherein D is an aperture diameter;
upon determining $$r_0 \geq \frac{D}{2}$$

is true, disabling the fast de-turbulence algorithm; and
upon determining $$r_0 \geq \frac{D}{2}$$

is false, applying the fast de-turbulence algorithm to the original image using $r_0$.

2. The method of claim 1, wherein the fast de-turbulence algorithm is a bispectrum speckle turbulence mitigation algorithm.

3. The method of claim 1, wherein the fast de-turbulence algorithm is a speckle-lite algorithm.

4. The method of claim 1, wherein the measuring the sharpness step is performed using a Laplacian method.

5. The method of claim 1, wherein the measuring the sharpness step is performed using a fast Fourier transform method.

6. The method of claim 1, wherein the measuring the sharpness step is performed using a gradient method.

7. The method of claim 1, wherein the measuring the sharpness step is performed using a contrast method.

8. The method of claim 1, wherein the measuring the sharpness step is performed using a Q-metric method.

9. A method for mitigating turbulence in an image, comprising:
- choosing a set of initial turbulence parameters;
- applying a bispectrum speckle turbulence mitigation algorithm using each initial turbulence parameter to an original image, resulting in an enhanced image;
- measuring a sharpness of the enhanced image using a Q-metric method;
- recording the sharpness and the corresponding initial turbulence parameter in a sharpness curve;
- calculating a knee of the sharpness curve;
- determining an estimated turbulence parameter $r_0$ according to the knee;
- determining whether $$r_0 \geq \frac{D}{2},$$

wherein D is an aperture diameter;

upon determining $$r_0 \geq \frac{D}{2}$$

is true, disabling the bispectrum speckle turbulence mitigation algorithm; and upon determining $$r_0 \geq \frac{D}{2}$$

is false, applying the bispectrum speckle turbulence mitigation algorithm to the original image using $r_0$.

* * * * *